US006759607B2

(12) United States Patent
Engler

(10) Patent No.: US 6,759,607 B2
(45) Date of Patent: Jul. 6, 2004

(54) COMMUNICATION/CONTROL DEVICE AND METHOD OF COMMUNICATING

(75) Inventor: James R. Engler, Depew, NY (US)

(73) Assignee: Curbell, Inc., Orchard Park, NY (US)

( * ) Notice: Subject to any disclaimer, the term of this patent is extended or adjusted under 35 U.S.C. 154(b) by 0 days.

(21) Appl. No.: 10/460,612

(22) Filed: Jun. 12, 2003

(65) Prior Publication Data

US 2003/0230469 A1 Dec. 18, 2003

Related U.S. Application Data

(60) Provisional application No. 60/388,148, filed on Jun. 12, 2002.

(51) Int. Cl.$^{7}$ .......................... H01H 9/00; H01H 35/00; H01H 9/54; H02B 1/00

(52) U.S. Cl. ..................... 200/5 R; 200/52 R; 381/123; 381/324

(58) Field of Search ................................ 200/5 R, 5 A, 200/6 A, 52 R, 512–517; 381/110, 122, 324, 330, 123

(56) References Cited

U.S. PATENT DOCUMENTS

| | | | | |
|---|---|---|---|---|
| 4,405,841 A | * | 9/1983 | Van Zeeland | 200/11 R |
| 4,654,488 A | * | 3/1987 | Westfall | 200/5 R |
| 4,918,264 A | * | 4/1990 | Yamamoto et al. | 200/5 R |
| 5,463,692 A | * | 10/1995 | Fackler | 381/324 |
| 5,805,717 A | * | 9/1998 | Mills | 381/110 |

* cited by examiner

*Primary Examiner*—James R. Scott
(74) *Attorney, Agent, or Firm*—Hodgson Russ LLP

(57) ABSTRACT

A communication/control device according to the invention may include a housing, a discrete switch and a membrane switch. The discrete switch and the membrane switch may be enclosed in the housing. The discrete switch may be in communication with a life-safety device. The membrane switch may be in communication with an environment device. In a method according to the invention, a housing is provided that has therein a discrete switch in communication with a life-safety device and a membrane switch in communication with an environment device. One of the switches may then be actuated to communicate information.

16 Claims, 5 Drawing Sheets

COMMUNICATION/CONTROL DEVICE AND METHOD OF COMMUNICATING

CROSS-REFERENCE TO RELATED APPLICATIONS

This application claims the benefit of priority to U.S. provisional patent application serial No. 60/388,148, filed on Jun. 12, 2002, now abandoned. The U.S. provisional patent application serial No. 60/388,148 is incorporated herein by reference.

FIELD OF THE INVENTION

The present invention relates to communication and control devices used by patients in a health care facility, such as hospital patients.

BACKGROUND OF THE INVENTION

In many hospitals, a communication/control device allows a patient to call a nurse by pressing a nurse-call-button on the device. The same communication/control device may also include buttons which enable the patient to alter her environment, for example, by controlling a television, turning on a light, or adjusting the position of a bed. Such communication/control devices may also include a speaker that may be used to listen to the audio portion of a television broadcast.

The number and types of devices that are controlled by such a communication/control device may vary from hospital to hospital. For example, the system which responds when a nurse-call-button is pressed in a first hospital may be designed differently from the system which responds when a nurse-call-button is pressed in a second hospital. Similarly, a television in a first hospital may be different from a television in a second hospital, and therefore the signals used to control the television in the first hospital may be different from the signals used to control the television in the second hospital. Consequently, communication/control devices in two different hospitals may be required to provide the same functions to a patient, but communicate with and control different systems.

Further, communication/control devices in two different hospitals may be required to provide different functions to patients. For example, in a first hospital, a communication/control device may be required to allow a patient to open and close the curtains, while in a second hospital, a communication/control device will not be used to open and close the curtains.

SUMMARY OF THE INVENTION

A communication/control device according to the invention may include a housing, a discrete switch and a membrane switch. The discrete switch and the membrane switch may be enclosed in the housing. The discrete switch may be in communication with a life-safety device. The membrane switch may be in communication with an environment device.

In a method according to the invention, a discrete switch and a membrane switch are provided. The discrete switch may be provided in communication with a life-safety device. The membrane switch may be provided in communication with an environment device. In the method, one of the switches is actuated in order to communicate information. In one embodiment of the invention, the discrete switch is actuated, and the information is a medical emergency. In another embodiment of the invention, the membrane switch is actuated, and the information is a desired change to the environment of an individual.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1:
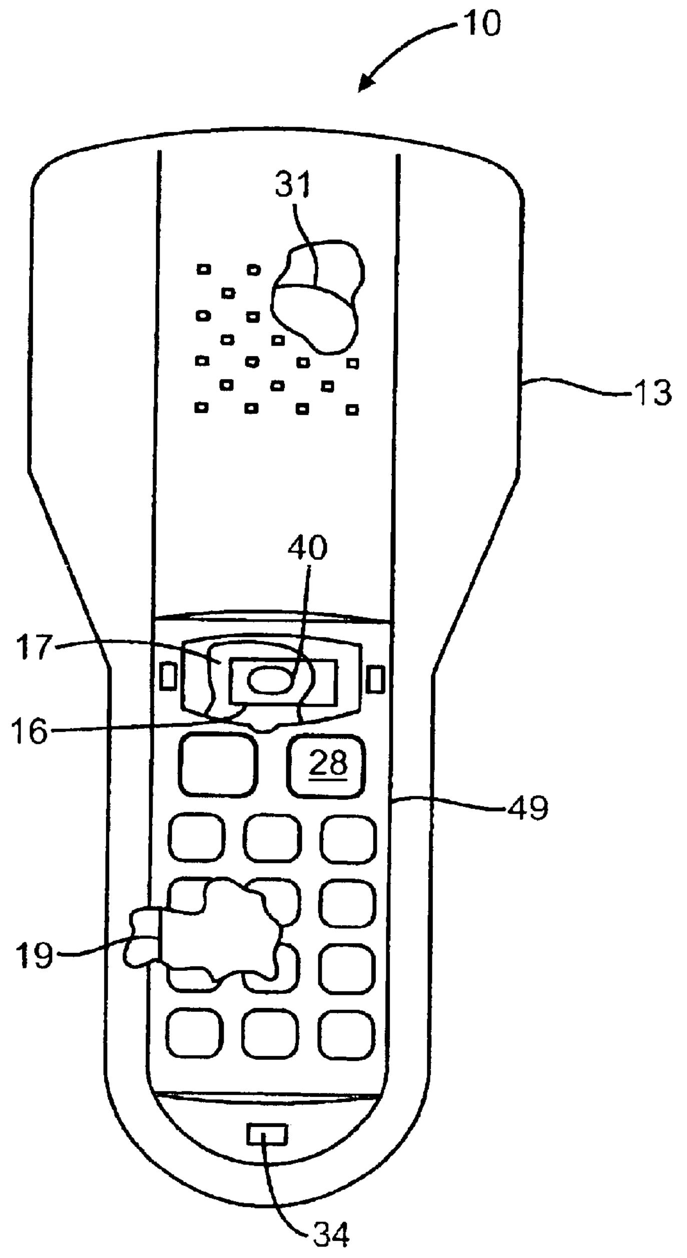
FIG. 1 is a plan view of a device according to an embodiment of the invention.

FIG. 1 shows a communication/control device 10 according to the invention. The communication/control device has a housing 13, a discrete switch 16 enclosed in the housing 10 and a membrane switch 19 enclosed in the housing 10. FIG. 1 shows the device 10 partially cut away to expose such a discrete switch 16 and a membrane switch 19. As discussed more fully below, by including both a discrete switch 16 and a membrane switch 19 in the same housing 10, benefits are realized that are not present in the prior art. For example, in accordance with the invention a single device 10 may be compactly configured to provide durable and reliable functionality for life-safety situations, as well as providing a multitude of environment-control functions.

Figure 2:
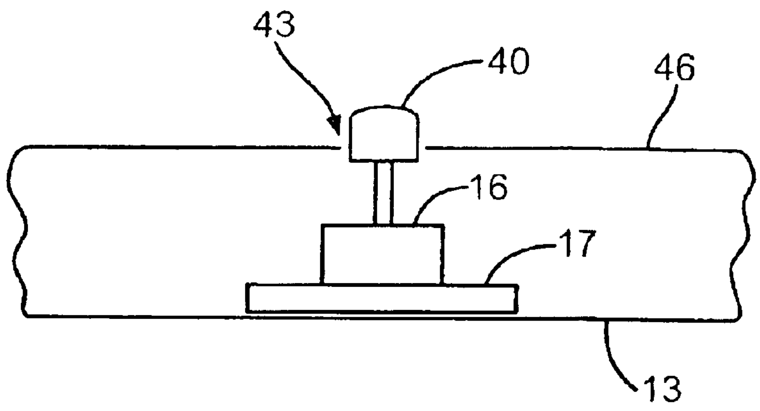
FIG. 2 is a side view of a discrete switch enclosed in a housing according to an embodiment of the invention.

FIG. 2 depicts the discrete switch 16. The discrete switch 16 may be mounted on a substrate 17, which may be a circuit board having thereon electrical conductors for electrically connecting the discrete switch 16 to other electrical components. The discrete switch 10 may be a type commonly referred to as a "board-mounted pushbutton switch" or "push button snap switch". Testing has shown discrete switches to be reliable and durable. Further, discrete switches can operate at a broader range of currents and voltages, thereby making them suitable for use with a wide variety of life-safety devices. For these reasons, the present invention utilizes a discrete switch 16 for life-safety functions.

Figure 3:
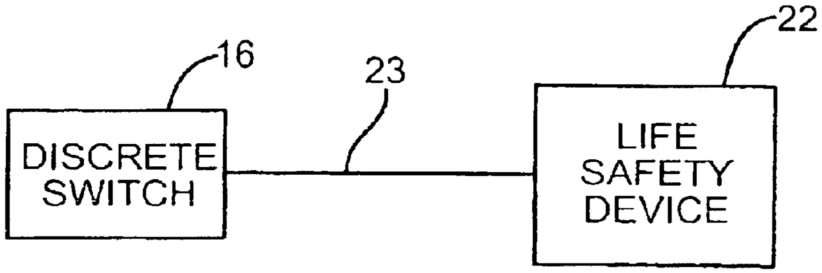
FIG. 3 is a block diagram of a system in accordance with an embodiment of the invention.

FIG. 3 shows that the discrete switch 16 may be in communication with one or more life-safety devices 22 via communication line 23. Communication line 23 may include conductors and electrical components necessary to provide a communication link between the discrete switch 16 and the life-safety device 22. The life-safety device 22 may be a light that signals to medical personnel that the patient needs assistance. Further, the life-safety device 22 may be a speaker that emits a warning noise to alert medical personnel of a problem.

Figure 4:
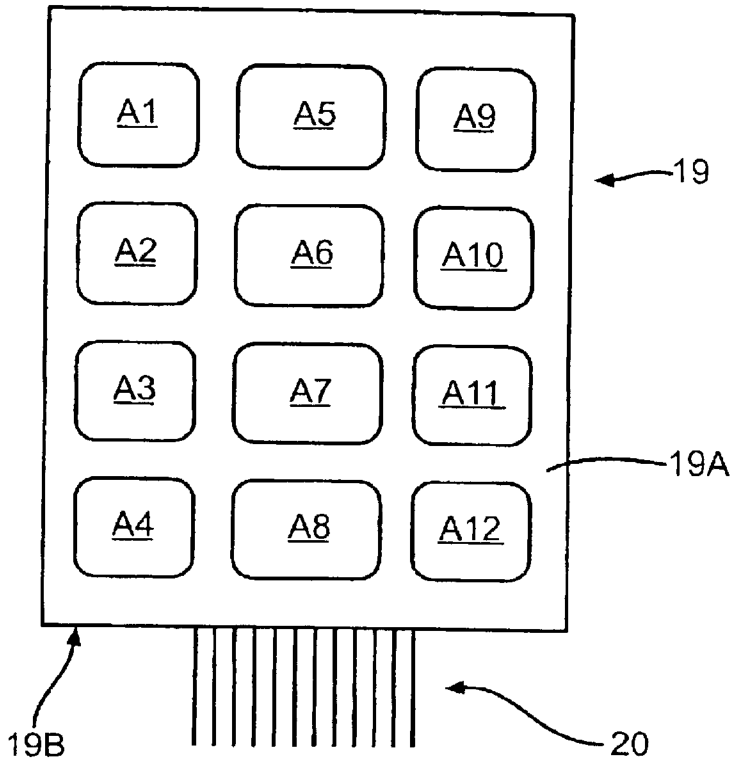
FIG. 4 is a plan view of a membrane switch according to an embodiment of the invention.
Figure 5:
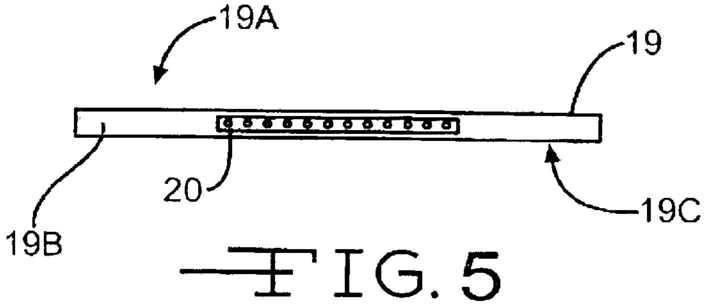
FIG. 5 is a side view of the membrane switch depicted in FIG. 4.
Figure 6:
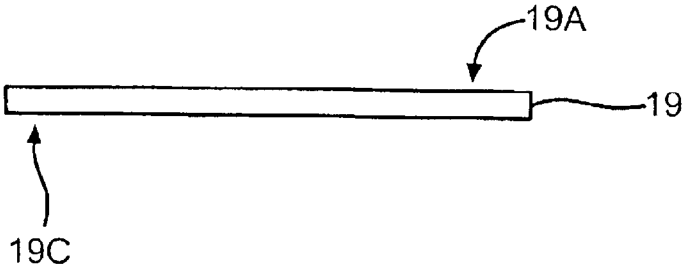
FIG. 6 is another side view of the membrane switch depicted in FIG. 4.

FIGS. 4, 5 and 6 show a membrane switch 19. The membrane switch 19 may include buttons A1–A12 located on a major surface 19A. A bus 20 may extend from a minor edge 19B of the membrane switch 19. By extending from the minor edge 19B, the housing 13 may be made thinner than if the bus 20 extended from the major surface 19A or an opposite major surface 19C.

Figure 7:
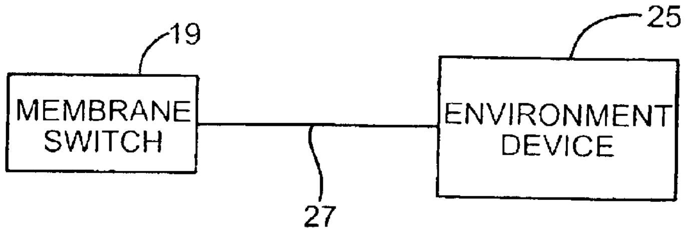
FIG. 7 is a block diagram of a system in accordance with an embodiment of the invention.

FIG. 7 shows that the membrane switch 19 may be in communication with one or more environment devices 25 via communication line 27. Communication line 27 may include conductors and electrical components necessary to provide a communication link between the membrane switch 19 and the environment device 25. Environment devices 25 may include a television, room light, reading light, a motor that positions curtains covering a window or a motor that positions the patient's bed.

Testing has shown that a membrane switch is not as durable or reliable as a discrete switch, but a membrane switch may be made into a compact form such that more buttons may be made available to a patient in a given space. The membrane switch 19 depicted in FIG. 4 has twelve buttons A1–A12, but fewer or more buttons may be provided. By having a large number of buttons A1–A12, a patient may be allowed to control many systems in many different ways. For these reasons, the present invention utilizes a membrane switch 19 to provide a patient with the ability to alter her environment via one or more environment devices 25.

A device 10 according to the invention, may include a toggle switch 28, which provides a toggle function. The toggle switch 28 may be provided as an additional discrete switch, or the toggle switch 28 may be provided as part of the membrane switch 19. In FIG. 1, the toggle switch 28 is shown as a discrete switch. When the toggle switch 28 is in a first toggle state, the membrane switch 19 may have a first function, and when the toggle switch 28 is in second toggle state the membrane switch 19 may have a second function. For example, when the toggle switch 28 is in the first toggle state, the membrane switch 19 may function to allow the patient to control a television, and when the toggle switch 28 is in the second toggle state, the membrane switch 19 may function to allow the patient to adjust lights and curtains in the room. Additional toggle switches may be provided as needed to meet the needs of the patient and the hospital.

In a different embodiment of the invention, a device 10 according to the invention may utilize the toggle switch 28 so that when the toggle switch 28 is in a first toggle state, the discrete switch 16 may have a first function, and in a second toggle state the discrete switch 16 may have a second function. For example, when the toggle switch 28 is in the second toggle state, the discrete switch 16 may function to allow the patient to communicate with hospital personnel regarding non-emergency desires, such as requesting assistance getting out of bed. Further, when the toggle switch 28 is in the first toggle state, the discrete switch 16 may function to allow the patient to communicate with hospital personnel regarding an emergency situation, such as the sudden onset of severe chest pain.

The toggle switch 28 may be provided to be biased toward either the first or second state. For example, the toggle switch 28 may be biased toward a state in which the functionality of the discrete switch 16 will allow the patient to communicate with hospital personnel regarding emergency situations. In this embodiment, the patient would be required, for example, to place the toggle switch 28 in the second state in order to use the discrete switch 16 to communicate with hospital personnel regarding non-emergency desires.

In a similar manner, the toggle switch 28 may be biased toward a state in which the membrane switch 19 allows the patient to control via an environment device 25 a first set of environment parameters, for example the volume, channel and picture quality on a television. In this embodiment, the patient might be required to place the toggle switch 28 in the second state in order to use the membrane switch 19 to control via another environment device 25 a second set of environment parameters, such as adjusting the room lights or operating a motor which moves the curtains.

A device 10 according to the invention may include a speaker 31. FIG. 1 shows the device 10 partially cut away to expose such a speaker 31. The speaker 31 may be utilized to provide the audio portion of a television broadcast or announcements from hospital personnel. The patient communication/control device 10 may include a microphone 34, which may be used to allow hospital personnel to listen to sounds emanating from the patient. By including a speaker 31 or microphone 34, the communication/control device 10 may provide one-way audio communication to or from the patient, and by including both a speaker 31 and a microphone 34 in the communication/control device 10, two-way audio communication may be provided to the patient.

Figure 8:
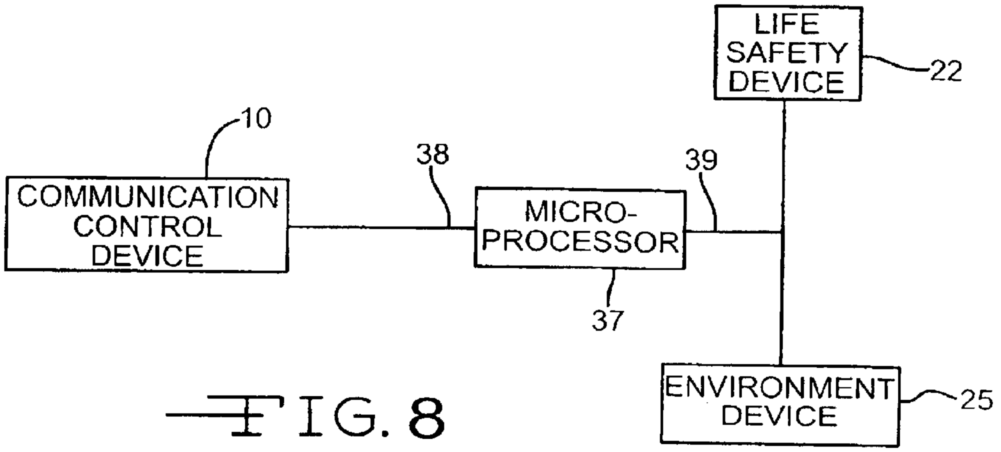
FIG. 8 is a block diagram of a system in accordance with an embodiment of the invention.

FIG. 8 shows the communication/control device 10 may be in communication with a microprocessor 37 via communication line 38. The microprocessor 37 may be programmed to respond to signals from the communication/control device 10 in a manner commensurate with the needs of a first hospital to control a life-safety device 22 or an environment device 25, or both via communication line 39. A similar communication/control device 10 may be in communication with a microprocessor 37 that is programmed in a manner commensurate with the needs of a second hospital. In this manner, many communication/control devices 10 may be manufactured according to a single design, and then each may be configured to meet the needs of the particular hospital in which it is installed.

Figure 9:
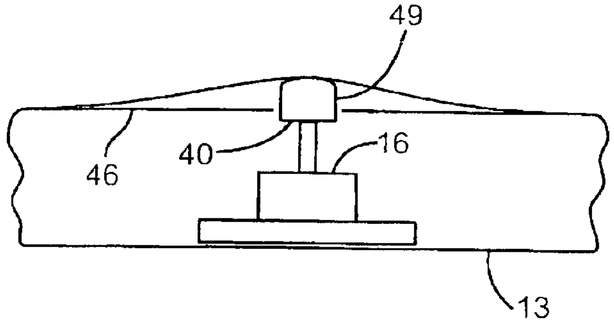
FIG. 9 is similar to FIG. 2, but includes a cover according to an embodiment of the invention.

Testing indicates that many discrete switches 16 are not resistant to the presence of liquid on or near a button 40 utilized by a patient. FIG. 2 shows that such discrete switches 16 commonly have an opening 43 in a switch panel 46, which may be part of the housing 13, through which the button 40 extends. The opening 43 is usually made large enough to allow the button 40 to move freely when actuated by the patient. FIG. 9 shows an embodiment of the invention which includes a flexible cover 49. The cover 49 may be sealed to the housing 10 in order to enclose the button 40 of the discrete switch 16, and thereby prevent liquid from seeping into the housing 10 and damaging the electrical components therein. In a variation of this embodiment, the cover 49 may extend so as to seal not only the button 40 of the discrete switch 16, but also the buttons A1–A12 of the membrane switch 19. In this manner, a uniform appearance may be provided to the patient.

Figure 10:
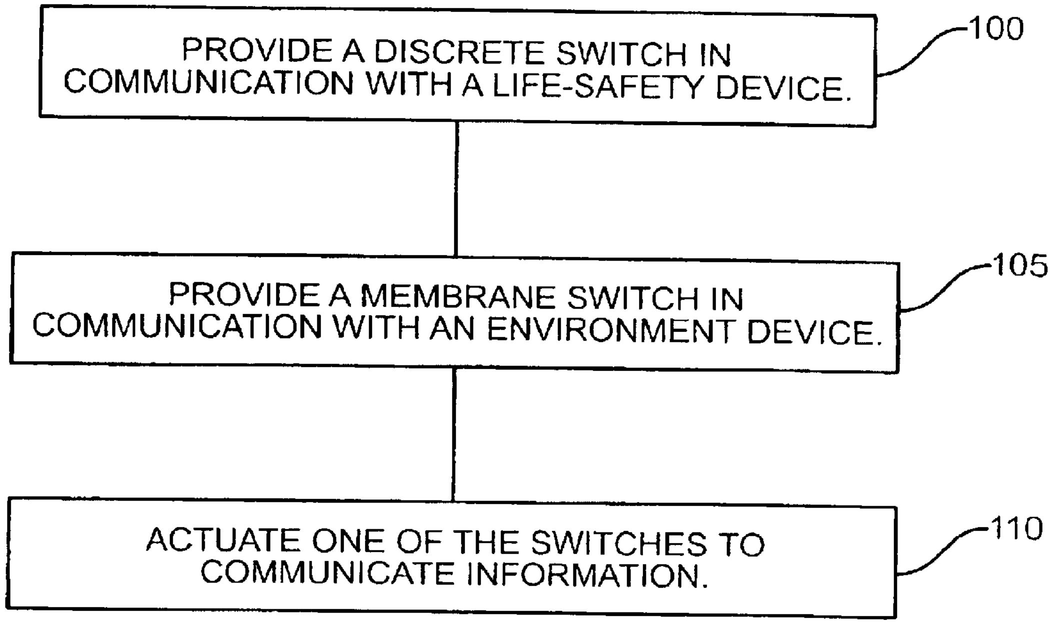
FIG. 10 is a block flow diagram of a method according to the present invention.

FIG. 10 illustrates a method according to the invention. In a method according to the invention, a discrete switch is provided 100 and a membrane switch is provided 105. A housing may be provided, and the discrete switch and the membrane switch may be provided in the housing. The discrete switch may be provided in communication with a life-safety device. The membrane switch may be provided in communication with an environment device. One of the switches may be actuated 110, for example by a patient, in order to communicate information. The information may be that a medical emergency exists. In such a situation, the discrete switch may be used to communicate the medical emergency information. In another embodiment of the invention, the information may be that an individual, such as a patient, desires a change of the individual's environment. In such a situation, the membrane switch may be actuated in order to communicate the desired change to the individual's environment.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A communication/control device, comprising:

a housing, a discrete switch enclosed in the housing, the discrete switch being in communication with a life-safety device, and a membrane switch enclosed in the housing, the membrane switch being in communication with an environment device, wherein the discrete switch may be operated to communicate information to the life-safety device without using the membrane switch.

2. The communication/control device of claim 1, wherein the life-safety device is a call light.

3. The communication/control device of claim 1, wherein the life-safety device is a sound emitting device.

4. The communication/control device of claim 3, wherein the life-safety device is a speaker.

5. The communication/control device of claim 1, wherein the environment device is a television.

6. The communication/control device of claim 1, wherein the environment device is room light.

7. The communication/control device of claim 1, further comprising a toggle switch, the toggle switch having a first toggle state in which the membrane switch has a first function, and a second toggle state in which the membrane switch has a second function.

8. The communication/control device of claim 1, further comprising a toggle switch, the toggle switch having a first toggle state in which the discrete switch has a first function, and a second toggle state in which the discrete switch has a second function.

9. The communication/control device of claim 1, further comprising a speaker enclosed in the housing.

10. The communication/control device of claim 1, further comprising a microphone enclosed in the housing.

11. The communication/control device of claim 1, wherein at least one of the switches is in communication with a microprocessor.

12. The communication/control device of claim 1, further comprising a flexible cover attached to the housing and extending so as to seal the discrete switch within the housing.

13. The communication/control device of claim 1, further comprising a bus extending from a minor edge of the membrane switch.

14. A method of communicating, comprising:

providing a housing having therein a discrete switch in communication with a life-safety device and a membrane switch in communication with an environment device, wherein the discrete switch may be operated to communicate information to the life-safety device without using the membrane switch; and actuating one of the switches to communicate information.

15. The method of claim 14, wherein the discrete switch is actuated, and the information is a medical emergency.

16. The method of claim 14 wherein the membrane switch is actuated, and the information is a desired change to the environment of an individual.

* * * * *